US012398669B1

(12) United States Patent
Bloomquist

(10) Patent No.: US 12,398,669 B1
(45) Date of Patent: Aug. 26, 2025

(54) CRANK GEAR SPRING ENGINE

(71) Applicant: Victor Rudolph Bloomquist, Brush Prairie, WA (US)

(72) Inventor: Victor Rudolph Bloomquist, Brush Prairie, WA (US)

( * ) Notice: Subject to any disclaimer, the term of this patent is extended or adjusted under 35 U.S.C. 154(b) by 0 days.

(21) Appl. No.: 18/445,970

(22) Filed: Apr. 23, 2024

(51) Int. Cl.
*F02B 75/32* (2006.01)

(52) U.S. Cl.
CPC .................................... *F02B 75/32* (2013.01)

(58) Field of Classification Search
CPC ....................................................... F02B 75/32
See application file for complete search history.

(56) References Cited

U.S. PATENT DOCUMENTS

| | | | | |
|---|---|---|---|---|
| 1,909,372 | A * | 5/1933 | Mccollum | F02B 75/32 123/197.1 |
| 6,260,532 | B1 * | 7/2001 | Mendler | F02B 75/047 123/192.2 |
| 2006/0048728 | A1 * | 3/2006 | Scalzo | F16H 21/32 123/53.1 |
| 2019/0360560 | A1 * | 11/2019 | Sanders | F16H 19/02 |
| 2020/0208522 | A1 * | 7/2020 | Giger | F01B 7/02 |

* cited by examiner

*Primary Examiner* — Grant Moubry
*Assistant Examiner* — Ruben Picon-Feliciano

(57) ABSTRACT

The invention is an apparatus for internal combustion engines; made up of crank gears, pivot frame, and control spring; the apparatus puts torque immediately on to the crank shaft at top dead center; the apparatus puts energy to use that is wasted by other engines at top dead center; other internal combustion engines push straight down on the crank shaft at top dead center; without getting any torque until the crank shaft passes by top dead center; this new idea apparatus is pushed down under combustion power at top dead center; putting turn power on the crank shaft at top dead center.

1 Claim, 3 Drawing Sheets

CRANK GEAR SPRING ENGINE

BRIEF SUMMARY OF THE INVENTION

Figure 1:
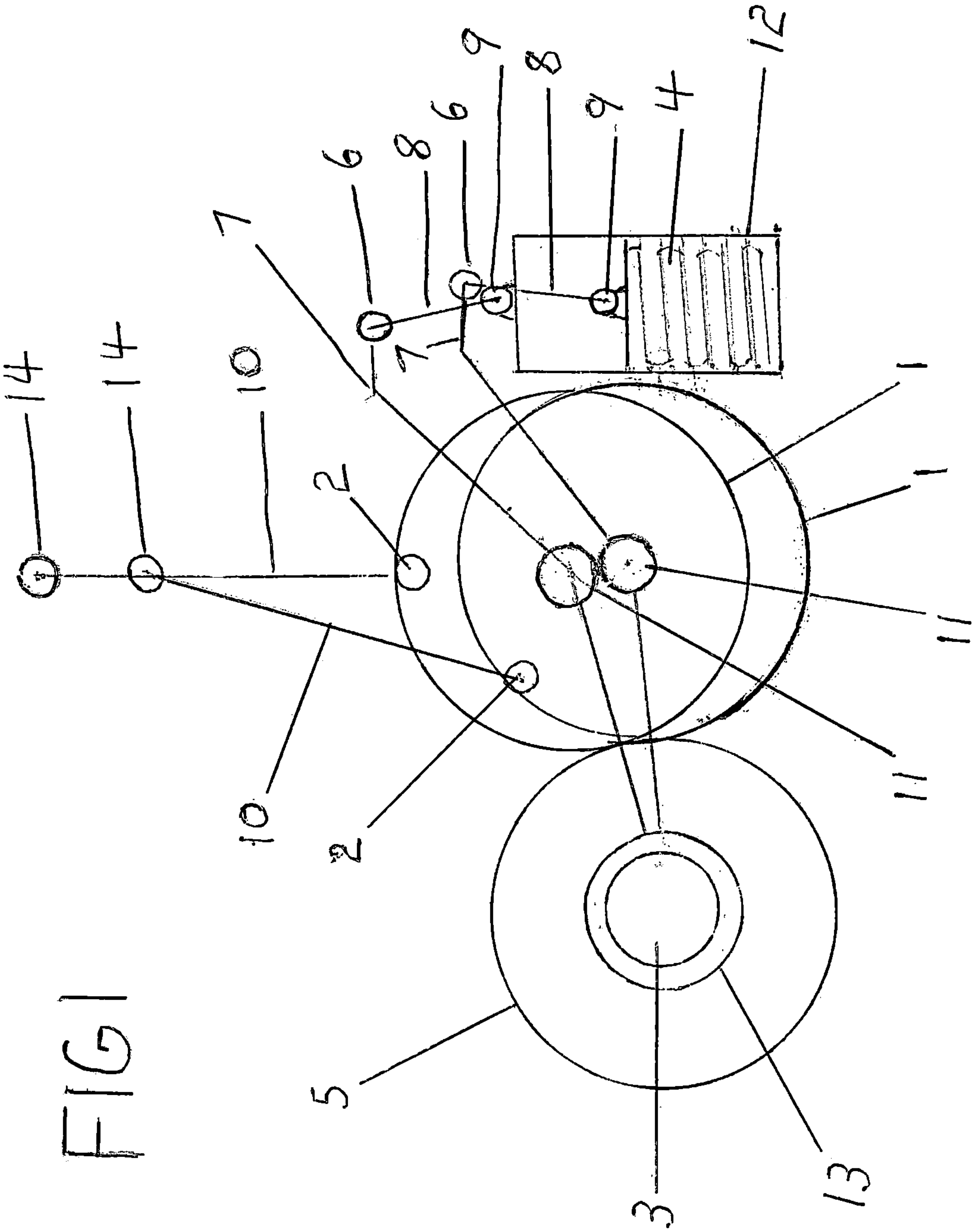
Figure 2:
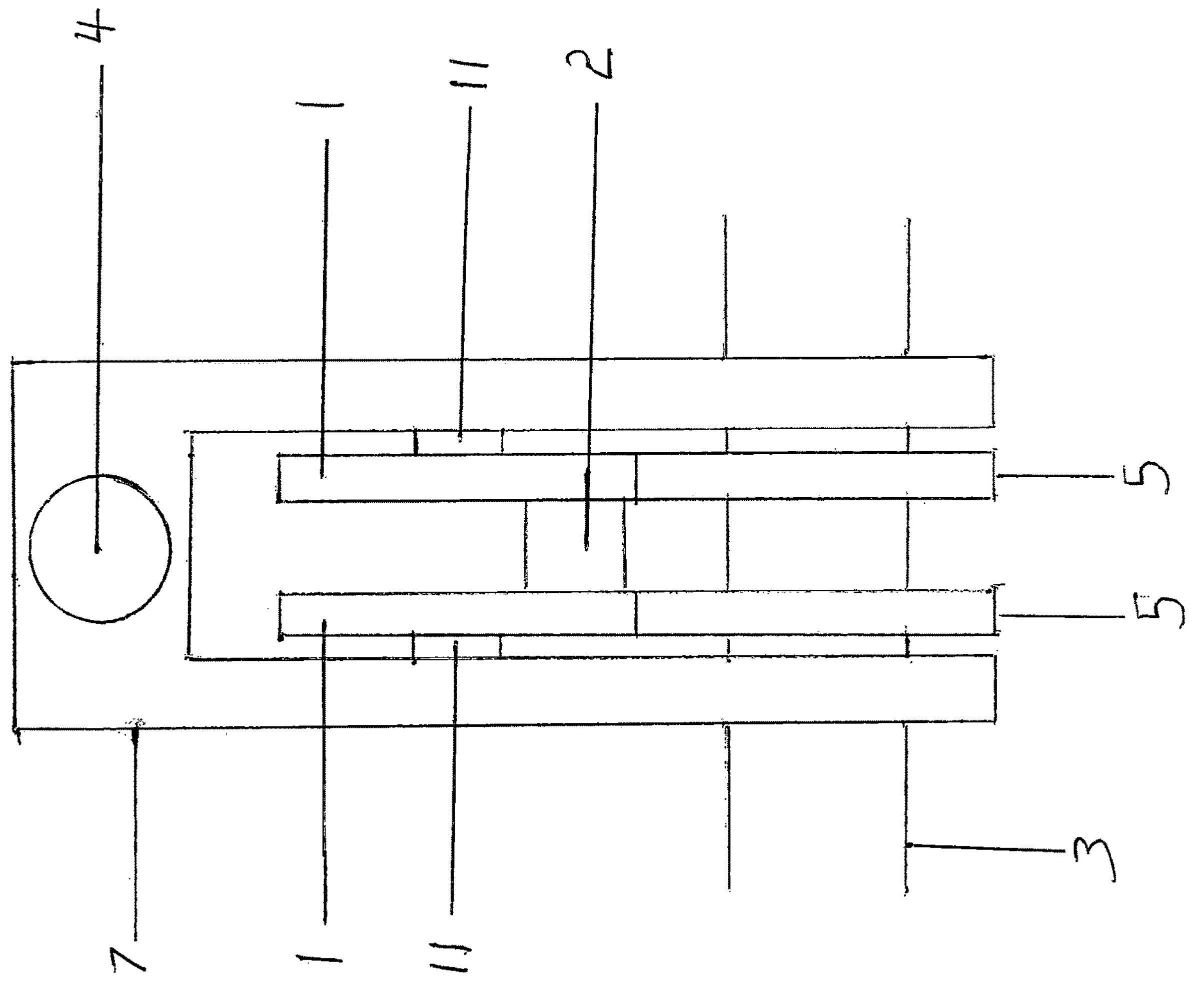
Figure 3:
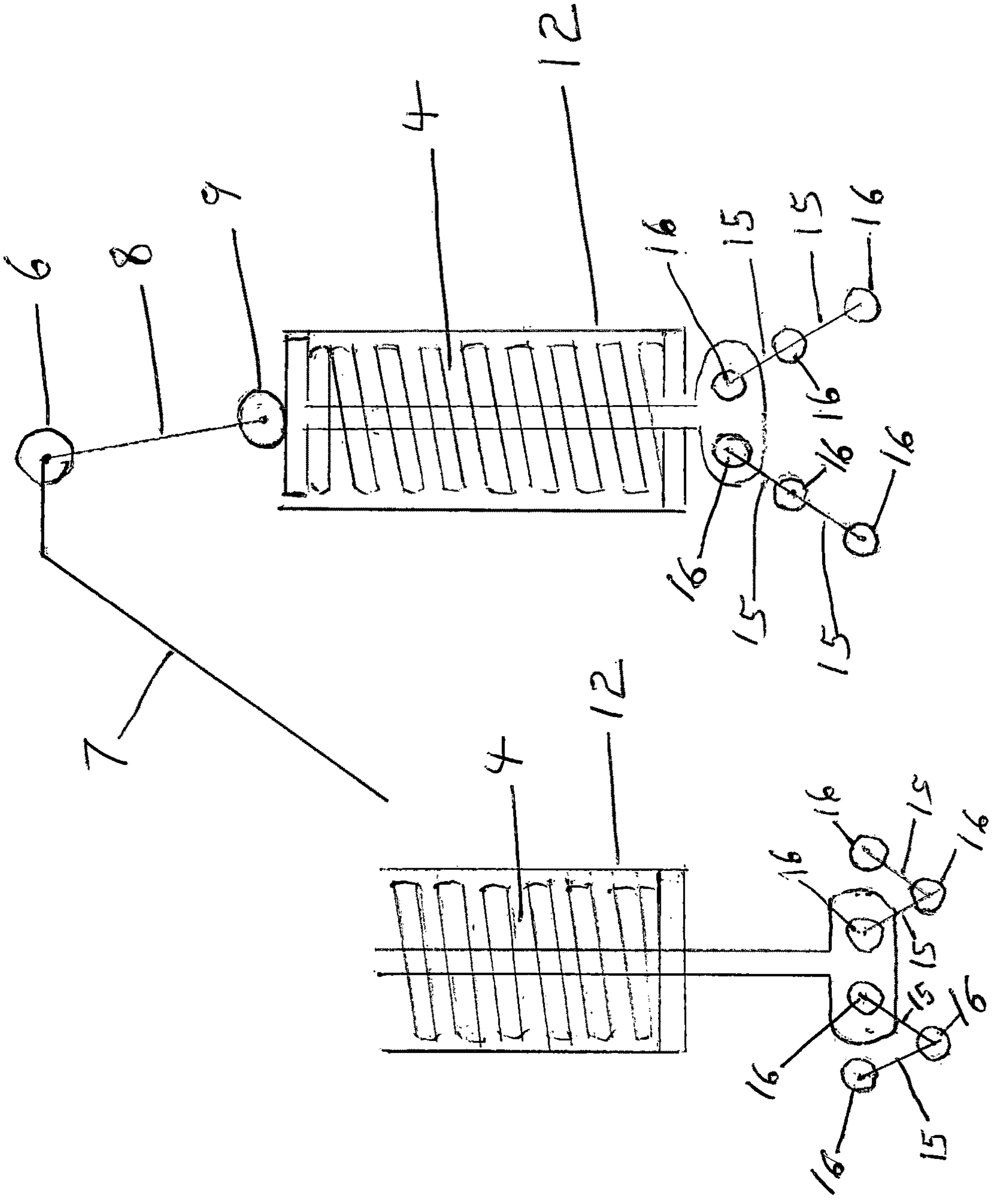

In the internal combustion engine when the crank shaft and the piston are at top dead center on the compression stroke and the fuel is ignited; the explosion force pushes heavily straight down and close to straight down on the crank shaft without much turn force on the crank shaft wasting energy; this invention turns the top dead center ignition force into usable torque; this is done by using a spring that gives way to compression at top dead center ignition; this transferring power from the piston conrod on to the crank gears on to crank shaft gears; by a pivot frame in which the crank gears are mounted and are meshed with the crank shaft gears.

BRIEF DESCRIPTION OF DRAWING ONE

Drawing one pictures two piston conrod driven gears connected together by a conrod journal; in the drawing these two gears are represented as a circle and are called the crank gears I and I and the conrod journal is identified as number 2; the two circles one higher than the other are the crank gears I and I and are the same gears in two different positions; the higher one is the crank gears I and I at top dead center of the piston compression stroke; the other circle positioned lower is the same crank gears I and I which have been pushed down by the fuel combustion on the piston at top dead center and some past top dead center; the power flows from the piston conrod I0 on to the crank gears I and I by journal 2; the power then flows on to the crank shaft gears 5, and 5 from crank gears I and I because the crank gears I and I are meshed to crank shaft gears 5 and 5; crank gears I and I are connected to pivot frame 7 by bearings; pivot frame 7 pivots on crank shaft 3 by two bearings I3 and I3 keeping crank gears I and I in mesh with crank shaft gears 5 and 5; pivot frame 7 moves crank gears I and I up and down on crank shaft gears 5 and 5; on the end of pivot frame 7 is bearing 6 connected to rod 8 connected to spring bearing 9 connected to spring 4 that controls the up and down travel of pivot frame 7.

Drawing two pictures pivot frame 7 connected to crank shaft 3 by two bearings I3 and I3; the two crank shaft gears 5 and 5 are solidly connected to the crank shaft 3; the two crank gears I and I, connected solidly together by journal 2, are meshed together with the two crank shaft gears 5 and 5; crank gears I and I are connected to pivot frame 7 by two shafts II and II; each gear having it's shaft attached to pivot frame 7 by bearings; the pivot frame 7 is extended over spring 4 so it can push the spring down; and the spring 4 can push the pivot frame 7 up.

Drawing three is two views of spring 4; the taller one is spring 4 holding pivot frame 7 up in engine time position; at the bottom of spring container I2 are four connecting rods each rod numbered I5 and six connecting rod bearings each numbered I6 to control the height of spring 4 to keep the engine in time; the short picture shows spring 4 in combustion compressed spring position; spring 4 is contained and held in place by container I2.

DESCRIPTION OF THE INVENTION

This invention has two sets of two gears; one set of gears 5 and 5 set solid on the crank shaft 3; the other set of gears I and I held together by connecting rod journal 2 are mounted on to pivot frame 7 by bearings; the pivot frame crank gears I and I are held in place so they can turn down and up meshed with the crank shaft gears 5 and 5; the pivot frame 7 is forced down by fuel combustion at top dead center because the piston conrod I0 is connected to journal 2 in the crank gears I and I in the pivot frame 7; the pivot frame 7 is then moved back up by spring 4; in an internal combustion engine the fuel is ignited when the crank shaft and piston are at top dead center; the combustion force at this time puts force straight down on the crank shaft and not on turning the crank shaft until the crank shaft has turned away from top dead center; with this new idea the spring 4 is strong enough to hold the pivot frame 7 up in the engine timed position through the compression stroke and fuel ignition; under the fuel combustion pressure at top dead center the spring is not strong enough to hold up and is pushed down moving the pivot frame 7 down; putting torque power on the crank shaft gears 5 and 5 meshed with the pivot frame crank gears I and I which are connected to the piston conrod I0; because when the crank gears I and I are forced down they take the crank shaft gears 5 and 5 down and around with them because they are meshed together; with this new idea wasted power at top dead center is converted into usable power turning the crank shaft 3; the spring 4 will have to have height control to keep the engine in time; the pivot frame 7 will always have to return to the same position; in drawing three is four rods each numbered I5 and six bearings each numbered I6 to make up an apparatus to control spring return height; there may be a better way of controlling return pivot frame 7 height.

The invention claimed is:

1. An internal combustion engine comprising:

a reciprocating piston;

a crankshaft;

wherein ignition of combustion mixture drives the reciprocating piston upward and downward;

a plurality of crank gears is mounted in a pivot frame, wherein the reciprocating piston is connected by a connecting rod to the plurality of crank gears;

wherein the plurality of crank gears is meshed to a plurality of crankshaft gears so that a rotational movement force of the plurality of crank gears is applied to the plurality of crankshaft gears;

wherein at top dead center of an initial combustion cycle with the connecting rod straight up and down, the connecting rod pushes the plurality of crank gears downward;

wherein the downward motion of the crank gears engages the crankshaft gears causing torque on the crankshaft upon the downward movement of the connecting rod;

wherein the internal combustion engine further includes a spring mounted to the pivot frame with at least two bearings and at least two rods, and said spring is further mounted inside a spring container; and wherein said spring is configured to push the pivot frame upward on the exhaust stroke of the combustion cycle.

* * * * *